Dec. 23, 1958
E. H. THIELENS
2,865,253
INFRARED ACHROMAT LENS
Filed Dec. 10, 1956
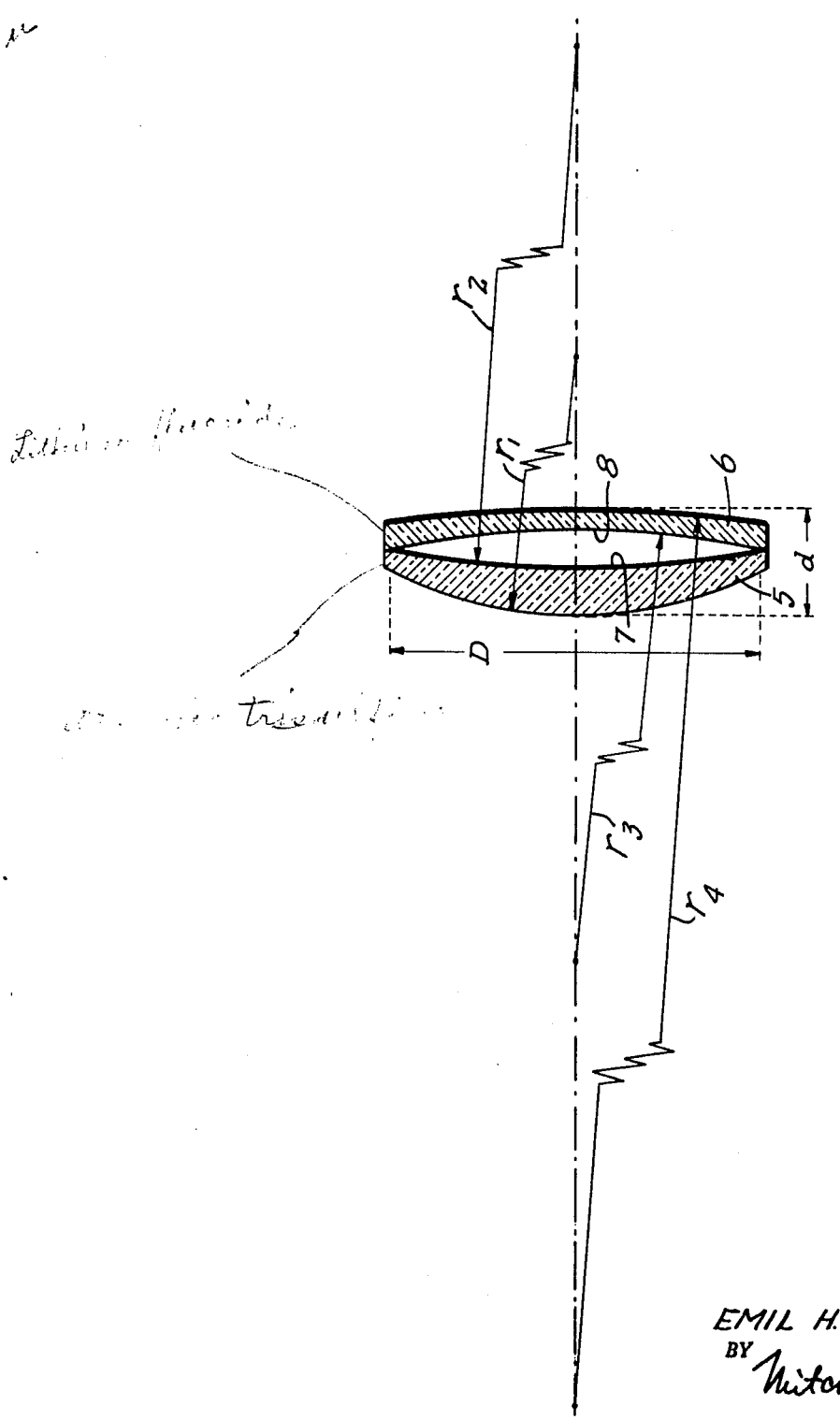
INVENTOR.
EMIL H. THIELENS
BY
ATTORNEYS

United States Patent Office 2,865,253
Patented Dec. 23, 1958

2,865,253

INFRARED ACHROMAT LENS

Emil H. Thielens, New York, N. Y., assignor to Servo Corporation of America, New Hyde Park, N. Y., a corporation of New York Application December 10, 1956, Serial No. 627,329

4 Claims. (Cl. 88—57)

My invention relates to a lens configuration, and in particular to a multiple-element lens having special utility in the infrared region.

It is an object of the invention to provide an improved lens of the character indicated.

It is another object to provide a lens configuration having relatively minor aberrations in the infrared region.

It is a specific object to achieve a substantially achromatic lens in the wavelength region from substantially two to substantially five microns.

It is a further specific object to provide a substantially achromatic multiple-element infrared lens in which at least the outer exposed element may be rugged enough to withstand abuse and atmospheric erosion, thus providing extended useful life for the lens.

Other objects and various further features of novelty and invention will be pointed out or will become apparent to those skilled in the art from a reading of the following specification in conjunction with the accompanying drawing. Said drawing is a sectional view on the optical axis of a lens incorporating features of the invention.

Briefly stated, the invention contemplates a fast lens construction featuring substantial achromatism in the infrared region extending at least between two and five microns wavelength. This result is achieved in a multiple-element structure in which positive and negative front and rear elements employ different infrared transmitting materials, and the arrangement is such that the adjacent faces of the front and rear elements define a convex air lens which may be viewed as a third element in the structure.

The figure of the drawing illustrates an embodiment of the multiple-element objective of the invention.

In the specific case illustrated, I have provided a multiple-element lens including a positive meniscus-shaped front element 5 adjacent a negative meniscus-shaped rear element 6. The adjacent surfaces 7—8 of lens elements 5—6 are concave, and therefore a convex air lens is defined by the space between surfaces 7—8. Both elements 5—6 are of infrared-transmitting materials, the element 5 being arsenic trisulfide glass; such glass is one of a family of glasses formed as the heat-reaction product of arsenic with one or more elements from the group including sulfur, selenium, and tellurium, as more fully set forth in copending patent applications, Serial No. 372,540, filed August 5, 1953, now abandoned, and Serial No. 417,724, filed March 22, 1954. The element 6 may be lithium fluoride.

The laws governing the design of an achromatic doublet require the use of two materials of different dispersive powers. Lithium fluoride has about $1/10$ of the "optical constringence" (10 times the dispersive power) of arsenic trisulfide glass in the 2 to 5 micron range. Therefore, when $As_2S_3$ and LiF are used in combination to form a doublet, only a small negative power contributed by the LiF is needed to achieve achromatization. The relative surface powers of the two lenses, as well as their center thicknesses and the axial thickness of the air lens between them constitute additional degrees of freedom as design parameters in order to minimize spherical aberration and coma.

I have found that a fast lens system having a relative aperture of $f/1.2$ may be obtained for a 100-mm. focal length, using radii $r_1$, $r_2$ for the arsenic trisulfide element 5 and radii $r_3$, $r_4$ for the lithium fluoride element 6, as follows:

$r_1 = 94.90$ mm.
$r_2 = 335.07$ mm.
$r_3 = 208.34$ mm.
$r_4 = 523.75$ mm.

For the particular lens shown, and having the above expressed dimensions, the diameter D of contact is 86.40 mm. and the axial thickness $d$ is 20.27 mm. The overall diameter is 90 mm. so that the elements 5—6 can contact each other over a peripherally continuous surface; assembly is thus facilitated.

It will be seen that I have disclosed an improved infrared-lens configuration, the specific example of which is found to have good achromatic transmission in the 2 to 5 micron wavelength region. This configuration is characterized by a wider aperture than has been possible to date, and at the same time axial aberrations are reduced. The high refractive index of the arsenic trisulfide ($As_2S_3$) makes possible the design of element 5 with relatively little curvature, and thus with relatively little spherical over-correction for a given focal length. The lithium fluoride (LiF), on the other hand, has a low refractive index and therefore requires relatively great curvature and much spherical undercorrection for a given focal length. In my present configuration, spherical over-correction and under-correction can be neutralized while leaving a residual high positive power to the system. As a consequence, the relative power between the two elements is approximately 1:10, and the power of the front element 5 is approximately 110 percent of the power of the system. The mechanical thickness $d$ is even less than one quarter of the diameter, for the 100-mm., $f/1.2$ system specified by way of example.

While I have described the invention in detail for the preferred form shown, it will be understood that modifications may be made within the scope of the invention as defined in the claims which follow.

I claim:

1. An optical objective, corrected for spherical and chromatic aberrations and coma in the wavelength region of 2 to 5 microns, comprising a positive meniscus lens of arsenic trisulfide and a negative meniscus lens of lithium fluoride defining a convex air lens therebetween, the radii of curvature of said positive lens being respectively substantially 95 percent and 335 percent of the focal length of said objective, and the radii of curvature of said negative lens being respectively substantially 210 percent and 525 percent of the focal length of said objective.

2. An optical objective, corrected for spherical and chromatic aberrations and coma in the wavelength region of 2 to 5 microns, for relative apertures as large as $f/1.2$, comprising a positive meniscus lens of arsenic trisulfide and a negative meniscus lens of lithium fluoride, defining a convex air lens therebetween, the radii of curvature of said positive lens being respectively substantially 95 percent and 335 percent of the focal length of said objective, and the radii of curvature of said negative lens being respectively substantially 208 percent and 524 percent of the focal length of said objective.

3. An objective according to claim 2, in which the maximum overall axial thickness of said lenses is substantially 20 percent of the local length of said objective.

4. An objective according to claim 2, in which said positive and negative lenses contact at a minimum diameter that is substantially 86 percent of the focal length of said objective.

References Cited in the file of this patent

UNITED STATES PATENTS

| | | |
|---|---|---|
| 61,812 | Dallmeyer | Feb. 5, 1867 |
| 1,536,919 | Parkinson | May 5, 1925 |
| 2,418,001 | Warmisham et al. | Mar. 25, 1947 |

FOREIGN PATENTS

| | | |
|---|---|---|
| 1,583 | Great Britain | of 1888 |
| 217,262 | Great Britain | June 11, 1924 |
| 343,087 | Germany | Oct. 27, 1921 |

OTHER REFERENCES

"Lithium-Fluoride Quartz Apochromat," Cartwright, pages 350, 351, Journ. Opt. Soc. of Amer., vol. 29, 1929.

"On Lithium Fluoride-Quartz Achromatic Lenses," Stockbarger et al., pages 29, 30, 31, Journ. Opt. Soc. of Amer., vol. 29, January, 1939.

"New Optical Glasses With Good Transparency in the Infrared," Rudolph Frerichs, pages 332, 1153–1157, Journ. Opt. Soc. Amer., vol. 43, No. 12, December 1953.